R. W. FUNK.
TOOL FOR OPERATING VEHICLE WHEEL RIMS.
APPLICATION FILED MAY 6, 1912.
1,146,419.
Patented July 13, 1915.
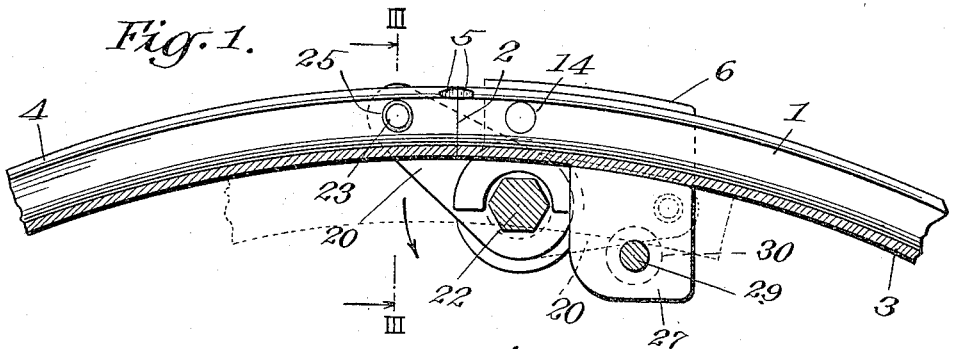
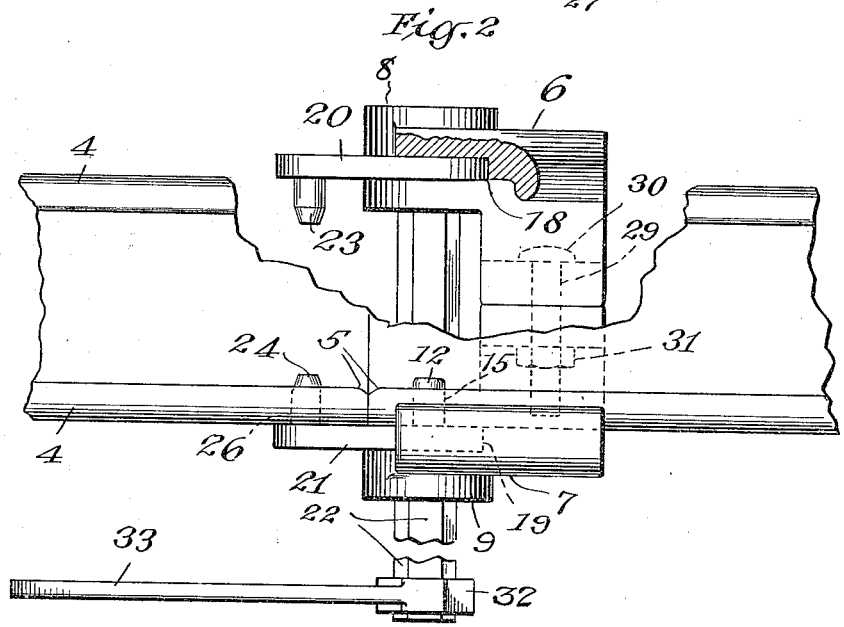
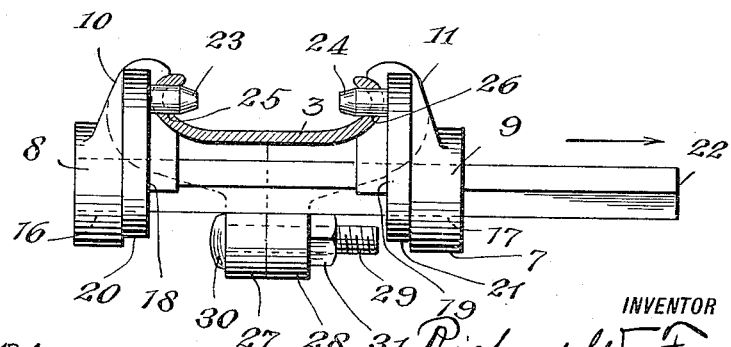
WITNESSES
INVENTOR
Richard W. Funk
BY
Seward Davis
ATTORNEY

UNITED STATES PATENT OFFICE.

RICHARD W. FUNK, OF WEEHAWKEN, NEW JERSEY, ASSIGNOR TO R. W. FUNK, INCORPORATED, OF NEW YORK, N. Y., A CORPORATION OF NEW YORK.

TOOL FOR OPERATING VEHICLE WHEEL-RIMS.

1,146,419.     Specification of Letters Patent.     Patented July 13, 1915.

Application filed May 6, 1912. Serial No. 695,415.

*To all whom it may concern:*

Be it known that I, RICHARD W. FUNK, a citizen of the United States, residing in the city of Weehawken, county of Hudson, State of New Jersey, have invented certain new and useful Improvements in Tools for Operating Vehicle Wheel-Rims, of which the following is a specification.

My invention relates to what are known as demountable "quick-detachable" rims, particularly adapted for use upon automobiles and the like and providing ready means for replacing a damaged tire upon a wheel with a minimum expenditure of time and effort. In rims of this type a separable tire-carrying rim is provided, and distinct means permanently carried by the wheel felly are used for securing the tire-carrying rim upon the wheel when in service. The "quick-detachable" type of rim further provides means for removing a tire from its associated rim and replacing a new tire thereon, an operation usually carried out after the tire-carrying rim and its tire have been removed as a unit from the wheel felly.

In order to accomplish the collapse of the tire-carrying rim or partial collapse thereof, the rim is transversely split so as to permit one of its ends to be displaced radially inward from its normal configuration, and the two ends then overlapped, effecting a substantial reduction in the circumference of the rim as a whole and permitting the stiff and heavy beads of the tire to be removed from the clenches of the rim, and then the complete removal of the tire from the rim.

One object of my invention is to provide simple and effective means for carrying out this collapse of the rim. For this purpose I provide a tool having a yoke member adapted to be detachably secured to the rim at one side of the split therein, this yoke member having pivotally connected therewith a link or links adapted to engage the other extremity of the rim adjacent to the split. Means are provided for causing this link to rotate about a center fixed with relation to the yoke member, and this fixed member is so situated as to cause the ends of the rim, first, to be slightly separated while substantially in normal alinement, then overlapped by the continued rotation of the link about its center, and when the overlapping is at a maximum, automatically to hold the rim in this collapsed position against and by virtue of the normal resiliency of the rim which tends to cause its ends to spring together.

My invention also provides new and novel means for mounting the removable rim and its associated tire in operative position upon the felly of the wheel.

In the accompanying drawings forming a part of this specification, Figure 1 is a longitudinal sectional view of a portion of a vehicle tire-carrying rim in normal position but with my improved tool applied thereto; Fig. 2 is a top view of the rim and tool, portions being broken away to show the structure; Fig. 3 is a transverse sectional view on line III—III of Fig. 1.

Referring to the drawings in detail, the numeral 1 designates the tire-carrying rim transversely split at 2 on a plane substantially radial and perpendicular to the major plane of the rim. The rim shown is of the usual clencher type, comprising a base portion 3 and clenches 4. To facilitate the removal of the tire from the rim when the latter is collapsed, the clenches are preferably cut away or beveled along a short arc at either side of the split in the rim, as shown at 5. The tool for operating the rim comprises two similar clamp members 6 and 7 having the barrel portions 8 and 9, respectively, and outstanding flanges 10 and 11 designed to embrace the clenches of the rim at opposite sides thereof. To one of these clamp members, as 7, is secured a pin 12 adapted to enter a hole 15 in the corresponding clench 4. The barrel portions are pierced with circular openings at 16 and 17 and slotted at 18 and 19 to receive links 20 and 21 carried upon a bar 22 which passes through the circular openings in the barrel portions of the two clamp members. This bar is preferably of hexagonal or other standard shape and passes through openings of the same character in the two links. An easy fit is provided between the link 21 and the bar, and a force fit between the link 20 and the bar. By this construction movement of the clamp member 7 along the bar is made possible, but similar movement of the clamp 6 is prevented. Carried upon the outer extremity of the links are the pins 23 and 24 adapted to enter sockets 25 and 26 in the other extremity of the rim adjacent to the split when the link members span the split, as shown in Figs. 1, 2 and 3. The clamp members are further provided with symmetrically arranged flanges 27 and 28 extending radially inward with respect to the wheel. These flanges are pierced to receive a bolt 29 having a head 30 and provided with a nut 31 for clamping the two parts together in the position shown in the drawings, so as to form a solid yoke member embracing a section of the rim and firmly clamped to it, and thus controlling the position of the adjacent section of the rim through the two links and their pins. A wrench-like tool 32 having a handle 33 is adapted to engage the projecting portion of the bar 22.

To detach the tool from the rim, it is only necessary to loosen the nut 31 and then to slide the member 7 with its associated parts along the bar 22 in the direction of the arrow of Fig. 3 until the pins can be freed from their sockets. To attach the tool the operation is reversed, the pins having first been introduced into their proper slots. The nut 31 is then screwed tight to bring the clamp members firmly into place, whereupon the rotation of the handle 33 will cause the link to rotate about the center of the bar 22 in the direction of the arrow in Fig. 1. This movement will first act to force the two sections of the rim apart at the split 2, owing to the angularity of the link with respect to the rim, and continued rotation will cause the section of the rim at the left of the drawing in Fig. 1 to move radially inward and finally to underlie the companion section, until the parts finally come to rest substantially in the position shown by the dotted lines in Fig. 1. It will be noted that in this position the rim is automatically locked, the center line of the link having passed the dead center and the tendency of the rim to cause its ends to re-aline, owing to its elasticity, will merely result in locking the rim more firmly in its collapsed position. The operation above outlined will cause a substantial decrease in the diameter of the rim and will free the beads of the tire from the clenches which normally retain them and permit the tire to be bodily removed from the rim. The reversal of the operation will permit a tire to be readily mounted upon the rim.

While I have illustrated and described only one specific embodiment of my invention, I appreciate that it is susceptible of variation and I do not desire to be limited to the precise structure shown, except as required by the scope of the claims.

Having thus described my invention, I claim:

1. A tool adapted to be used with a transversely split tire-carrying rim for causing the sections of said rim to overlap, comprising a pair of grip members, means for detachably clamping together such members to grip a rim at one side of the split therein, a link pivotally connected to one of said members, and means on said link for engaging the rim at the other side of the split therein, and means for rotating said link, the point at which the link is pivoted to the member being at a less distance from the center of the wheel than the point of connection with said rim when the link has been rotated to the extreme collapsed position of the rim.

2. A tool for operating a transversely split tire-carrying rim comprising a pair of grip members, means for detachably clamping together such members to grip a rim on one side of the split therein, a link entering a slot in each of said members and pivoted thereto on a line substantially parallel to the axis of the rim, means connecting said links and causing them to oscillate about their pivots synchronously, and means on the free ends of said links for engaging the other extremity of the tire-carrying rim, the point at which the link is pivoted to the member being at a less distance from the center of the wheel than the point at which the link is attached to the rim.

3. A tool for operating a transversely split tire-carrying rim comprising a pair of grip members, means for detachably clamping together such members to grip a rim on one side of the split therein, a link entering a slot in each of said members and pivoted thereto on a line substantially parallel to the axis of the rim, means connecting said links and causing them to oscillate about their pivots synchronously, and means on the free ends of said links for engaging the other extremity of the rim, the point at which the link is pivoted to the member being at a less distance from the center of the wheel than the point at which the link is attached to the rim, and at a less distance from the center of the wheel than the point of connection with said rim when the link has been rotated to the extreme collapsed position of the rim.

RICHARD W. FUNK.

Witnesses:
 SEWARD DAVIS,
 KARL S. DEITZ.

Copies of this patent may be obtained for five cents each, by addressing the "Commissioner of Patents, Washington, D. C."